United States Patent [19]

Hobes et al.

[11] 4,314,035
[45] * Feb. 2, 1982

[54] METHOD FOR THE PREPARATION OF POLYMER FOAMS

[75] Inventors: John-Victor Hobes, Dinslaken; Wolfgang Payer, Wesel, both of Fed. Rep. of Germany

[73] Assignee: Ruhrchemie Aktiengesellschaft, Oberhausen, Fed. Rep. of Germany

[*] Notice: The portion of the term of this patent subsequent to Jan. 20, 1998, has been disclaimed.

[21] Appl. No.: 179,864

[22] Filed: Aug. 20, 1980

Related U.S. Application Data

[63] Continuation of Ser. No. 55,880, Jul. 9, 1979, Pat. No. 4,246,357, and a continuation of Ser. No. 115,782, Jan. 28, 1980, abandoned.

[30] Foreign Application Priority Data

Jul. 10, 1978 [DE] Fed. Rep. of Germany ....... 2830328
Feb. 3, 1979 [DE] Fed. Rep. of Germany ....... 2904082

[51] Int. Cl.$^3$ .............................................. C08J 9/02
[52] U.S. Cl. ........................................ 521/77; 521/98; 521/141; 521/149; 525/62
[58] Field of Search ...................... 521/77, 141, 149; 525/62

[56] References Cited

U.S. PATENT DOCUMENTS

| | | | |
|---|---|---|---|
| 3,044,970 | 7/1962 | Baumeister et al. | 521/77 |
| 3,760,047 | 9/1973 | Gaeth et al. | 521/77 |
| 4,119,687 | 10/1978 | Resy et al. | 525/62 |
| 4,135,026 | 1/1979 | Hoyt et al. | 525/62 |
| 4,151,134 | 4/1979 | McClain | 525/62 |
| 4,155,893 | 5/1979 | Fujimoto et al. | 525/62 |
| 4,246,357 | 1/1981 | Hobes et al. | 521/141 |

FOREIGN PATENT DOCUMENTS 7085 9/1979 European Pat. Off. .
5776 10/1978 Fed. Rep. of Germany .

*Primary Examiner*—Morton Foelak
*Attorney, Agent, or Firm*—Bierman & Bierman

[57] ABSTRACT

Foamable copolymers and copolymer mixtures comprising 35% to 98% by weight ethylene, 1% to 30% by weight vinyl alcohol, 1% to 30% by weight acrylic acid esters of secondary or tertiary alcohols, and 0 to 5% by weight vinyl ester are disclosed. All percentages are based upon the total weight of the copolymer or mixture. Methods of foaming such materials, foamed materials made therefrom, and methods of preparation thereof are also disclosed.

25 Claims, No Drawings

METHOD FOR THE PREPARATION OF POLYMER FOAMS

This application is a continuation of application Ser. No. 55,880 now U.S. Pat. No. 4,246,357, filed July 9, 1979 and Application Ser. No. 115,782 filed Jan. 28, 1980, ABAND which in turn claim the priorities of German No. P 28 30 328.8-44 filed July 10, 1978, and German No. P 29 04 082.2 filed Feb. 3, 1979.

The present invention is directed to a process for the preparation of polymer foams from copolymers and mixtures of ethylenically unsaturated copolymers.

The plastic foams which are the end products of the present process have a wide range of applications. They are useful, not only as packaging materials, but also as heat and sound insulation. In the present energy shortage, their usefulness as thermal insulation is of particular importance.

Foamed plastics as such have been known in the prior art for many years. Various thermoplastic resins such as polyurethanes, polystyrenes, polyethylene, polyvinyl chloride, etc. have been used as the starting materials for the production of such products. The foam formation can be effected by any one of several known methods. For example, a compound which decomposes at melt temperature to form gas may be incorporated into the plastic material. The gas formed expands the melt and forms the desired cores or cells. Alternatively, an inert gas can be introduced into the plastic under very high pressure. When this pressure is released, foaming takes place.

These methods, and the other methods of the prior art, suffer generally from the disadvantage that foaming must take place in two stages. The first stage requires closed molds (preferably mounted in presses), and the second stage involves the actual foaming of the composition at normal pressure and at a temperature somewhat higher than the softening point.

Japanese application No. 71/36,374 (reported in Chemical Abstracts Vol. 77, 1972, No. 89 428 ff.) teaches a method of preparing foams without the addition of foaming agents. The foam is induced by the formation of gaseous decomposition products resulting from the heating of the thermoplastic. Suitable materials include copolymers of ethylene with vinyl acetate, vinyl butyrate, methyl acrylate, or methacrylic acid. These materials are heated in the absence of oxygen at temperatures such that the decomposition occurs without splitting the polymer chains. However, this method provides foamed materials that are only slightly crosslinked. Moreover, the pore structure is not particularly prominent and is not affected very much by variations in the composition of the starting substances.

SUMMARY OF THE INVENTION

It is an object of the invention to provide foamable copolymers or copolymer mixtures which consist of 35% to 98% (preferably 40% to 98%) by weight of ethylene units, 1 to 30% by weight of vinyl alcohol units, 1 to 30% by weight of acrylic acid ester units of secondary or tertiary alcohols and up to 5% (preferably 2%) by weight of vinyl ester units. The preferred vinyl ester is the acetate. It is an important characteristic of the copolymers or copolymer mixtures according to the invention that they contain 1%–30% by weight of vinyl alcohol.

The copolymers can be prepared by reacting ethylene, vinyl esters and acrylic acid esters in known manner at pressures of 400 to 4,000 bars (preferably 1,500 to 2,500 bars) and temperatures of 110° to 350° C. (preferably 220° to 290° C.) in autoclave or tubular reactors. To obtain polymers having the approximate composition of 15% to 96.8% by weight of ethylene, 1.2% to 45% by weight of vinyl ester and 2% to 40% by weight of acrylic acid ester from which the polymers according to the invention are prepared, the mixture of monomers must have approximately the following composition because of the different polymerization rates of the monomers: 40% to 98% by weight of ethylene, 1.5% to 50% by weight of vinyl esters, and 0.5% to 10% by weight of acrylic acid ester. Particularly contemplated vinyl esters include: vinyl propionate, vinyl butyrate. Preferred acrylic acid esters are derived from sec. butanol, tert. butanol, sec. pentanol, and tert. pentanol.

The polymerization is carried out in the presence of catalytic amounts of free radical intiators, such as oxygen, in amounts of 2 to 250 moles/ppm, based on ethylene to be polymerized. Suitable initiators other than oxygen include peroxides such as tert-butyl perbenzoate, dilauroyl peroxide, di-tert-butyl peroxide or azobutyric acid dinitrile in amounts of 200 moles/ppm, based on ethylene. The polymerization is advantageously carried out in the presence of moderators such as aliphatic alcohols and carbonyl compounds, saturated and unsaturated hydrocarbons or chlorinated hydrocarbons and hydrogen.

For the conversion into the copolymer which contains vinyl alcohol, the copolymer consisting of ethylene, vinyl ester and acrylic acid ester is saponified. This is accomplished by reacting the polymer with an alcoholic solution of an alkali metal hydroxide. The alkali metal hydroxide is used in an amount of 1 to 5% by weight, based on polymer charged. The alcohol is a $C_1$ to $C_4$ alcohol, especially methanol, ethanol and propanol. The alkali metal hydroxide is present therein in an amount of 1 to 10 weight percent. The reaction is carried out at temperatures of 60° to 120° C., preferably 80° to 100° C. The reaction time is 100 to 250 (preferably 120 to 180) minutes. When maintaining the reaction conditions mentioned above, the acrylic acid ester remains unchanged.

According to the invention, the copolymers which consist of ethylene, vinyl alcohol and acrylic acid ester and still contain small amounts, i.e., up to 2% by weight, of unchanged vinyl acetate can be foamed by heating them for 5 to 60 minutes at temperatures of 250° to 350° C. The duration of the treating time is dependent on the selected temperature, higher temperatures requiring shorter heating times than lower temperatures. On the other hand, the time of heating is independent of the composition of the copolymer by monomers.

The thermal treatment can be effected within or outside a mold depending upon the intended use of the copolymer. To ensure that the thermoplastic is not chemically influenced by oxidation processes, care should be taken that foaming is effected with exclusion of oxygen. To this end, heating is effected either in a closed mold or with addition of an inert gas.

Heating causes the acrylic acid ester contained in the polymer to be thermally cleaved to acrylic acid and olefin which acts as blowing agent. It is possible by variation of the acrylic acid ester content in the copolymer to influence the pore structure of the foam and, consequently, its density. The higher the acrylic acid ester concentration in the polymer, the lower its density.

The shape and size of the pores can further be controlled in known manner by admixing with the copolymer so-called nucleating agents such as finely powdered silicates, zinc oxide or chalk.

It has also been found that mixtures of various copolymers rather than copolymerized monomers, can be used with equally good results. Thus, in accordance with another aspect of the present invention, two copolymers can be made, which are than blended together and subjected to foam formation by heat in the absence of oxygen. For example, ethylene and t-butyl acrylate are copolymerized to form Component A. Separately, an ethylene/vinyl alcohol/vinyl acetate copolymer (B) is obtained from an ethylene/vinylacetate copolymer in a similar saponification reaction as described before (p. 4). Components A and B are mixed together and subjected to heat in the range of 250° to 350° C. in the absence of oxygen. This causes the desired foaming.

The copolymers which are useful in this embodiment comprise 35% to 98% by weight ethylene, 1 to 30% by weight vinyl alcohol, 1 to 30% by weight of acrylic acid esters of secondary or tertiary alcohols, and 0% to 5% by weight of vinyl ester. The foregoing percentages are all based on the total mixture. This mixture is heated for 5 to 60 minutes at 250° to 350° C. in the absence of oxygen. As a result, decomposition occurs, gas is generated, and the softened plastic is foamed.

The qualitative and quantitative compositions of the individual copolymers contained in the overall mixture do not affect the process of the present invention. The important factor is the composition of the total mixture, coupled with the presence of certain monomer units in specific weight proportion. This is true insofar as the number and proportions of the particular copolymers contained in the overall mixture are concerned.

However, it should be noted that the presence of vinyl alcohol units and/or acrylic acid ester units of secondary or tertiary alcohols is required in each individual copolymer. These groups constitute the reactive members in the chains and cause foam formation and, more importantly, cross-linking. It has been found that cross-linking (without foam formation) is also produced by the presence of three carboxyl groups in the macromolecule. Therefore, monomers bearing these radicals may also be included in addition to vinyl alcohol and acrylic acid esters.

While the usual method would use only two copolymers to be blended with one another to produce the foams of the present invention, it is entirely possible, and within the scope of this embodiment, to use blends comprising more than two copolymers. One of the features of this form of the present invention is its extreme flexibility as to the polymers which are useful. By varying the composition of the total mixture with regard to the individual copolymer components, wide variations can be obtained in the properties of the ultimate foams produced. This enables the user to tailor the particular foam to individual requirements.

Copolymers which may be included in the overall mixture are exemplified by various binary polymers. Particularly suitable are ethylene and acrylic acid, ethylene and acrylic acid esters of secondary or tertiary alcohols, and ethylene and vinyl alcohol. Examples of ternary copolymers are ethylene, vinyl alcohol, and vinyl acetate; and ethylene, acrylic acid esters, and acrylamide. In addition to the quarternary copolymer of ethylene, acrylic acid esters, acrylic acid or methacrylic acid, and acrylamide, the five monomer copolymer of ethylene, acrylic acid esters, acrylic acid, vinyl alcohol and vinyl acetate has also been found suitable. For best results, the molecular weight of the copolymers should be between 10,000 and 100,000.

In general, the preparation of the individual copolymers is carried out in accordance with known techniques. Normally, this is done under high pressure in a tubular reactor or in reactors provided with stirrers. Pressures are in the range of 1500 to 3500 atmospheres and the temperatures are 200° to 350° C. Suitable initiators such as oxygen, peroxides, or azo compounds are used. Specifically, t-butyl perbenzoate, dilauroyl peroxide, and azo-butyro-dinitrile are particularly useful. The initiators are normally used in amounts of 2 to 200 mols/ppm, based on the monomers employed. The polymerization itself is preferably carried out in the presence of moderators such as aliphatic alcohols, carbonyl compounds, saturated and unsaturated hydrocarbons, chlorinated hydrocarbons, or hydrogen.

A convenient way to prepare the copolymers of vinyl alcohol is to hydrolize copolymers containing the corresponding vinyl esters. For example, the polymer may be reacted with an alcoholic solution of alkali hydroxide. The alkali hydroxide is advantageously used in an amount of 1 to 5% by weight, based upon the polymer. The reaction is carried out at 60° to 120° C., preferably 80° to 100° C. The reaction time is from 100 to 250 minutes, preferably 120 to 180 minutes. Any acrylic acid esters contained in the copolymer remain unaltered under these reaction conditions. Usually, all of the vinyl ester (preferably vinyl acetate) is not converted to the alcohol. Thus, a residual vinyl ester content remains in the copolymers.

In accordance with the present invention, mixtures of the described copolymers serve as the starting point for the production of polymer foams. The copolymers are mechanically mixed prior to the thermal treatment. To produce uniform foamed products, care should be taken to insure that the mixture of starting substances is homogeneous.

In order to carry out the actual foaming, the mixture of copolymers is heated for five to sixty minutes at temperatures of 250° to 350° C. The time depends upon the temperature to a great degree. Higher temperatures require shorter times than do the lower temperatures. On the other hand, it should be noted that heating time is substantially independent of the composition of the polymer mixture.

To be certain that the thermoplastic mixture is not affected chemically by oxidation, the heating and foaming step should be carried out in the absence of oxygen. Depending on the ultimate intended use, this can be done by either heating the mixture in a closed and sealed mold, or by providing an inert atmosphere under which the heating takes place.

The acrylic acid ester contained in at least one of the copolymers decomposes under heat to form acrylic acid and an olefin. The latter acts as the foaming agent. By varying the proportion of acrylic acid ester in the mixture, it is possible to correspondingly influence the pore structure of the ultimate plastic foam produced. The higher the acrylic acid ester concentration in the mixture, the greater the amount of porosity and the lower the density of the ultimate product.

The shape and size of the pores can be regulated in known manner by the addition of nucleating agents, such as finely powdered silicates, zinc oxide, or chalk.

One of the advantages of the materials of the present invention is the cross-linking which occurs during the reaction. Transverse bonds are formed between the polymer chains because of the intermolecular condensation. Therefore, these foams are insoluble in the usual solvents and are characterized by high thermal stability and high strength values.

The degree of cross-linking can be controlled by variations in the proportion of vinyl alcohol present. The higher the vinyl alcohol concentration in the mixture, the greater the degree of cross-linking of the foamed polymer mixture.

The products of the present invention are useful as packing material and for thermal and sonic insulation. In addition, they have been found to be extremely suitable as thermoplastic adhesives for a very wide range of substrates. In particular, they are useful for bonding metals to one another or to materials such as glass, ceramics, and plastics.

Particularly suitable for the preparation of foams in both forms of the invention are acrylic acid esters of tertiary alcohols having 4 to 8 carbon atoms such as tert-butyl alcohol. Esters of secondary alcohols may also be used with the same success. However, these require higher cleavage temperatures than the esters of tertiary alcohols. Ester groups which are particularly contemplated are those derived from the following alcohols: sec. butanol, tert. butanol, sec. pentanol, and tert. pentanol.

In order to more particularly illustrate the advantages of the present invention, several examples thereof are included herein. In all of the following cases, the copolymers or copolymer mixtures are heated in an inert gas atmosphere for 30 minutes at 300° C. The copolymers containing vinyl alcohol are obtained from the corresponding vinyl acetate copolymers by hydrolysis with a 5% alcohol NaOH solution at about 90° C. in a reaction vessel with stirring and cooling. Reflux is also provided.

In order to determine the characteristics of the products of the examples, the following test methods were used:

1. Shear or cutting resistance

The shear resistance is measured with a Zwick tensile testing machine (vertical model), in whose jaws the 90° bent surfaces (30×100 mm²) of a steel sheet-foam material-steel sheet composite system are clamped. The actual bonding surface (70×100 mm²) is aligned vertically to the jaws. The traction rate is 50 mm/minute. The tearing and sheer forces are registered by means of a recorder.

2. Tensile impact strength (DIN 53 448)

A 1 mm thick plate which is struck with a pendulum impact-testing machine serves as the test body. The impact work performed (in mJ/mm²) under normal amount conditions of 23° C. and 50% relative atmospheric humidity is measured.

3. Melt index measurement ($i_2$ value; DIN 53 735)

The measurements are carried out with a "Z 465" test device manufactured by Zwick & Co., at temperatures of 190° C. and an applied pressure of 2.16 kg. The amount in grams ejected in 10 minutes through a nozzle 2.095 mm in diameter and 8 mm long is measured.

4. Measurement of the reduced "specific" viscosity (RSV value)

The reduced viscosity is defined as the quotient of the specific viscosity and concentration of the solution, and is measured using solutions of the test material in decalin (0.025 g/100 ml of solvent) and with the aid of a Ubbelohde capillary viscosimeter. The dissolution of the sample material in decalin and the viscosity measurements are carried out at 100° C.±0.2° C.

EXAMPLE 1

In this Example and in Examples 2 to 4, the ethylene/vinyl acetate/acrylic acid ester copolymer is prepared as follows:

The starting materials are polymerized in the mixture which is suitable for the preparation of a copolymer having a specific composition, the polymerization being carried out with addition of atmospheric oxygen as initiator and propane as controlling agent in an autoclave at 250° C. and under pressure of 2200 bars.

The saponification of the copolymers containing vinyl acetate to form the corresponding copolymers containing vinyl alcohol is also carried out in Examples 1 to 4 in the same manner by reacting the polymer with an 8 percent alcoholic NaOH solution at about 90° C. (reflux) in a reaction vessel with stirring. The reaction is completed after 120 minutes.

In the present Example 1, a mixture of
87.7% by weight of ethylene,
8.5% by weight of vinyl acetate, and
3.8% by weight of tert.-butyl acrylate
is polymerized to form a copolymer composed of
76% by weight of ethylene,
7.2% by weight of vinyl acetate, and
16.8% by weight of tert.-butyl acrylate.
This copolymer is then saponified. This results in a product which consists of
78.7% by weight of ethylene units,
4.0% by weight of vinyl alcohol units,
16.8% by weight of tert.-butyl acrylate units, and
0.5% by weight of vinyl acetate units
and has a melt index whose $i_2$ value (g./10 min.) is 160. The polymer has an RSV value (reduced specific viscosity) of 0.57.

The ethylene/vinyl alcohol/tert.-butyl acrylate copolymer which still contains small amounts of vinyl acetate is subjected to a thermal treatment at 300° C. for 30 minutes in an inert gas atmosphere. The tert.-butyl acrylate units are decomposed thereby with cleavage of iso-butylene. At the same time, the hydroxyl and carboxyl groups react intermolecularly with formation of cross-linked products which are foamed by the isobutylene.

The $i_2$ value of the product of the thermal treatment is no longer determinable.

The foam product is characterized by excellent adhesive properties and high toughness.

|  | Impact tensile strength (mJ/mm²) | Peel adhesion (N/mm.) |
| --- | --- | --- |
| Starting product | 900 | 0.9 |
| Foamed final product | 1500 | 2.4 |

EXAMPLE 2

By polymerization of a mixture of
85.6% by weight of ethylene,
12.1% by weight of vinyl acetate, and 2.3% by weight of tert.-butyl acrylate,
a copolymer composed of
79.0% by weight of ethylene,
10.5% by weight of vinyl acetate, and
10.5% by weight of tert.-butyl acrylate
is prepared and then saponified. A product consisting of
83.1% by weight of ethylene units,
5.8% by weight of vinyl alcohol units,
10.5% by weight of tert.-butyl acrylate units, and
0.6% by weight of vinyl acetate units
and having an $i_2$ value of 100 (g./10 min.) and an RSV value of 0.70 is obtained.

The copolymer which contains ethylene, vinyl alcohol, tert.-butyl acrylate and small amounts of vinyl acetate is thermally treated at 280° C. in an inert gas atmosphere for 60 minutes.

A foamed, cross-linked product, the $i_2$ value of which is no longer determinable is obtained.

The foam is distinguished by excellent adhesive properties and high toughness. Its properties are compared in the following table with the properties of the starting product (i.e. the non-foamed polymer).

|  | Impact tensile strength (mJ/mm.$^2$) | Peel Adhesion (N/mm.) |
|---|---|---|
| Starting product | 800 | 0.8 |
| Foamed final product | 1400 | 2.1 |

EXAMPLE 2a (Comparative Example)

By polymerization of a mixture of
88.6% by weight of ethylene and
11.4% by weight of vinyl acetate,
a copolymer consisting of
91.0% by weight of ethylene and
9.0% by weight of vinyl acetate
and having a melt flow index value (190/2.16) of 0.6 g./10 min. is prepared.

After having been heated to 300° C. for 30 minutes under an inert gas atmosphere, the polymer does not show any alteration. Slight foaming is observed as late as after heating for a total of 120 minutes.

While the $i_2$ value of the thermally treated material is reduced to 0.2 g./10 min., only 1% of the polymer is cross-linked. The adhesive properties measured by the peel adhesion which is 0.6 N/mm.$^2$ are unchanged as compared with those of the starting material.

EXAMPLE 3

By polymerization of a mixture of
95.8% by weight of ethylene,
3.6% by weight of vinyl acetate, and
0.6% by weight of tert.-butyl acrylate,
a copolymer composed of
95.2% by weight of ethylene,
2.1% by weight of vinyl acetate, and
2.7% by weight of tert.-butyl acrylate
is prepared and then saponified. This results in a product which consists of
95.9% by weight of ethylene units,
1.2% by weight of vinyl alcohol units,
2.7% by weight of tert.-butyl acrylate units, and
0.2% by weight of vinyl acetate units
and has an $i_2$ value of 2.5 (g./10 min.) and an RSV value of 1.05.

The copolymer which contains ethylene, vinyl alcohol, t-butyl acrylate and small amounts of vinyl acetate is thermally treated at 280° C. in an inert gas atmosphere for 60 minutes. This results in a foamed cross-linked product, the $i_2$ value of which is no longer determinable.

The foam is characterized by excellent adhesive properties and high toughness. Its properties are compared in the following table with the properties of the starting product (i.e. the non-foamed polymer).

|  | Impact tensile strength (mJ/mm.$^2$) | Peel adhesion (N/mm.) |
|---|---|---|
| Starting product | 550 | 0.2 |
| Foamed final product | 1225 | 1.4 |

EXAMPLE 4

By polymerization of a mixture of
65.9% by weight of ethylene,
29.1% by weight of vinyl acetate, and
5.0% by weight of tert.-butyl acrylate,
a copolymer composed of
52.5% by weight of ethylene,
25.2% by weight of vinyl acetate, and
22.3% by weight of tert.-butyl acrylate
is prepared and thereafter saponified. This results in a product which consists of
61.8% by weight of ethylene units,
14.8% by weight of vinyl alcohol units,
22.3% by weight of tert.-butyl acrylate units, and
1.1% by weight of vinyl acetate units
and has an $i_2$ value of 500 and an RSV value of 0.39.

The copolymer which contains ethylene, vinyl alcohol, t-butyl acrylate and small amounts of vinyl acetate is thermally treated at 300° C. in an inert gas atmosphere for 30 minutes.

There is obtained a highly foamed cross-linked product, the $i_2$ value of which can no longer be determined.

The foam is characterized by excellent adhesive properties and high toughness. Its properties are compared in the following table with the properties of the starting product (i.e. the non-foamed polymer).

|  | Impact tensile strength (mJ/mm.$^2$) | Peel adhesion (N/mm.) |
|---|---|---|
| Starting product | 950 | 1.0 |
| Foamed final product | 2300 | 3.2 |

EXAMPLE 5

Preparation of a foam material from a mixture of an ethylene/tert.-butyl acrylate copolymer and an ethylene/vinyl alcohol/vinyl acetate copolymer.

Component A

Composition:
81.4% by weight of ethylene
18.6% by weight of tert.-butyl acrylate
prepared by polymerizing a mixture of 95.9% by weight of ethylene and 4.1% by weight of t-butyl acrylate. The polymer has an RSV value of 0.40.

Component B

Composition:
81.1% by weight of ethylene
17.0% by weight of vinyl alcohol
1.9% by weight of vinyl acetate prepared by polymerizing a mixture of 66.5% by weight of ethylene and 33.5% by weight of vinyl acetate, followed by hydrolysis of the polymerization product. The polymer has an RSV value of 0.30.

The components A and B are mixed in a ratio of 1:1 and thermally treated. A foamed, cross-linked product is obtained. The following Table summarizes the properties of the starting components and final product:

| Component | Tensile impact strength (mJ/mm$^2$) | Shear strength/slicing resistance (N/mm) | $i_2$-value (g/10 mins) |
|---|---|---|---|
| A | 625 | 0.5 | 40 |
| B | 550 | 0 | 80 |
| End product | 1400 | 2.2 | 0 |

EXAMPLE 6

Preparation of a foam material from a mixture of an ethylene/tert.-butyl acrylate/vinyl alcohol/vinyl acetate copolymer and an ethylene/acrylic acid copolymer.

Component A

Composition:
85.4% by weight of ethylene
11.2% by weight of tert.-butyl acrylate
2.4% by weight of vinyl alcohol
1.0% by weight of vinyl acetate
prepared by polymerizing a mixture of 91.6% by weight of ethylene, 2.6% by weight of tert.-butyl acrylate and 5.8% by weight of vinyl acetate, followed by hydrolysis of the polymerization product. The polymer has an RSV value of 0.8.

Component B

Composition:
87.7% by weight of ethylene
12.3% by weight of acrylic acid
prepared by polymerizing a mixture of 96.8% by weight of ethylene and 3.2% by weight of acrylic acid. The polymer has an RSV value of 0.33.

The components A and B are mixed in a ratio of 2:3 and thermally treated. A foamed, cross-linked product is obtained. The properties of the starting components and end product are summarized in the following Table:

| Component | Tensile impact strength (mJ/mm$^2$) | Shear strength/slicing resistance (N/mm) | $i_2$-value (g/10 mins) |
|---|---|---|---|
| A | 825 | 0.7 | 12.0 |
| B | 750 | 0.5 | 660.0 |
| End product | 1700 | 2.9 | 0 |

EXAMPLE 7

Preparation of a foam material from a mixture of an ethylene/tert.-butyl acrylate copolymer and an ethylene/vinyl alcohol/vinyl acetate copolymer.

Component A

Composition:
94.7% by weight of ethylene
5.3% by weight of tert.-butyl acrylate
prepared by polymerizing a mixture of
98.8% by weight of ethylene
1.2% by weight of tert.-butyl acrylate
The polymer has an RSV value of 0.75.

Component B

Composition:
91.9% by weight of ethylene
7.3% by weight of vinyl alcohol
0.8% by weight of vinyl acetate
prepared by polymerizing a mixture of 87.1% by weight of ethylene and 12.9% by weight of vinyl acetate, followed by hydrolysis of the polymerization product. The polymer has an RSV value of 0.5.

The components A and B are mixed in a ratio of 3:2 and thermally treated. A foamed, cross-linked product is obtained. The properties of the starting components and end product are summarized in the following Table:

| Component | Tensile impact strength (mJ/mm$^2$) | Shear strength/slicing resistance (N/mm) | $i_2$-value (g/10 min) |
|---|---|---|---|
| A | 950 | 0.4 | 18.5 |
| B | 500 | 0.5 | 32.0 |
| End product | 1600 | 1.9 | 0 |

EXAMPLE 8

Preparation of a foam material from a mixture of an ethylene/ethyl acrylate/acrylic acid/vinyl alcohol/vinyl acetate copolymer and an ethylene/tert.-butyl acrylate copolymer.

Component A

Composition:
88.9% by weight of ethylene
5.3% by weight of ethyl acrylate
2.5% by weight of acrylic acid
2.4% by weight of vinyl alcohol
0.9% by weight of vinyl acetate
prepared by polymerizing a mixture of 92.2% by weight of ethylene, 2.2% by weight of ethyl acrylate and 5.6% by weight of vinyl acetate, followed by hydrolysis of the polymerization product. The polymer has an RSV value of 0.55.

Component B

Composition:
94.7% by weight of ethylene
5.3% by weight of tert.-butyl acrylate
prepared by polymerizing a mixture of 98.8% by weight of ethylene and 1.2% by weight of vinyl acetate.
The polymer has an RSV value of 0.5.

The components A and B are mixed in a ratio of 1:1 and thermally treated. A foamed, cross-linked product is obtained. The properties of the starting components and end product are summarized in the following Table:

| Component | Tensile impact strength (mJ/mm$^2$) | Shear strength/slicing resistance (N/mm) | $i_2$-value (g/10 mins) |
|---|---|---|---|
| A | 750 | 0.6 | 28.5 |
| B | 950 | 0.4 | 80.0 |
| End product | 2100 | 2.6 | 0 |

EXAMPLE 9

Preparation of a foam material from a mixture of an ethylene/tert.-butyl acrylate/acrylamide copolymer and an ethylene/vinyl alcohol/vinyl acetate copolymer.

Component A

Composition:
87.0% by weight of ethylene
9.2% by weight of tert.-butyl acrylate
3.8% by weight of acrylamide
prepared by polymerizing a mixture of 96.9% by weight of ethylene, 2.1% by weight of tert.-butyl acrylate and 1.0% by weight of acrylamide.
The polymer has an RSV value of 0.75.

Component B

Composition:
81.1% by weight of ethylene
17.0% by weight of vinyl alcohol
1.9% by weight of vinyl acetate
prepared by polymerizing a mixture of 66.5% by weight of ethylene and 33.5% by weight of vinyl acetate, followed by hydrolysis of the polymerization product.
The polymer has an RSV value of 0.30.

The components A and B are mixed in a ratio of 3:2 and thermally treated. A famed, cross-linked product is obtained. The properties of the starting components and end product are summarized in the following Table:

| Component | Tensile impact strength (mJ/mm$^2$) | Shear strength/slicing resistance (N/mm) | $i_2$-value (g/10 mins) |
| --- | --- | --- | --- |
| A | 750 | 0.3 | 18.0 |
| B | 550 | 0 | 80.0 |
| End product | 1250 | 1.8 | 0 |

EXAMPLE 10

Preparation of a foam material from a mixture of an ethylene/tert.-butyl acrylate/methacrylic acid/acrylamide copolymer and an ethylene/vinyl alcohol/vinyl acetate copolymer.

Component A

Composition:
85.7% by weight of ethylene
5.3% by weight of tert.-butyl acrylate
4.8% by weight of methacrylic acid
4.2% by weight of acrylamide
prepared by polymerizing a mixture of 96.4% by weight of ethylene, 1.2% by weight of tert.-butyl acrylate, 1.3% by weight of methacrylic acid, and 1.1% by weight of acrylamide.
The polymer has an RSV value of 0.75.

Component B

Composition:
91.9% by weight of ethylene
7.3% by weight of vinyl alcohol
0.8% by weight of vinyl acetate
prepared by polymerizing a mixture of 86.8% by weight of ethylene and 13.2% by weight of vinyl acetate, followed by hydrolysis of the polymerization product.
The polymer has an RSV value of 0.35.

The components A and B are mixed in a ratio of 1:1 and thermally treated. A foamed, cross-linked product is obtained. The properties of the starting components and end product are summarized in the following Table:

| Component | Tensile impact strength (mJ/mm$^2$) | Shear strength/slicing resistance (N/mm) | $i_2$-value (g/10 mins) |
| --- | --- | --- | --- |
| A | 850 | 0.4 | 8.0 |
| B | 625 | 0.2 | 68.0 |
| End product | 1550 | 2.2 | 0 |

While only a limited number of specific embodiments of the present invention have been expressly disclosed, it is, nonetheless, to be broadly construed and not to be limited except by the character of the claims appended hereto.

What we claim is:

1. A foamable copolymer or a mixture of copolymers comprising
    (a) 35% to 98% by weight ethylene;
    (b) 1% to 30% by weight vinyl alcohol;
    (c) 1% to 30% by weight acrylic acid esters of secondary or tertiary alcohols; and
    (d) 0% to 5% by weight vinyl ester; all percentages being based on the total weight of said copolymer or said mixture.

2. A copolymer or mixture according to claim 1 wherein said ethylene is from 40% to 98% and (d) is 0% to 2% vinyl acetate.

3. A copolymer or mixture according to claim 1 wherein (c) is esters of a tertiary alcohol having 4 to 8 carbon atoms.

4. A foamed cross-linked copolymer of a saponified copolymer of ethylene, vinyl alcohol and an acrylic acid ester of a secondary or tertiary alcohol, said saponified copolymer containing
    (a) 40% to 98% by weight ethylene;
    (b) 1% to 30% by weight vinyl alcohol;
    1% to 30% by weight acrylic acid esters; and
    (d) 0% to 2% by weight vinyl acetate.

5. A copolymer according to claim 4 wherein said esters are of a tertiary alcohol having 4 to 8 carbon atoms.

6. A copolymer according to claim 4 wherein said esters are of secondary butanol, tertiary butanol, secondary pentanol and tertiary pentanol.

7. A copolymer according to claim 4 wherein said polymer prior to saponification comprises
    (a) 15% to 96.8% by weight ethylene;
    (b) 1.2% to 45% by weight of vinyl esters;
    (c) 2% to 40% by weight of acrylic acid esters.

8. A copolymer or copolymer mixture according to claim 1 wherein (c) is t-butyl acrylate.

9. A copolymer or copolymer mixture according to claim 1 wherein (d) is vinyl acetate.

10. A copolymer or copolymer mixture according to claim 1 wherein (a) is 80% to 95% by weight ethylene.

11. A copolymer or copolymer mixture according to claim 1 wherein there is 2% to 10% by weight of (c) present.

12. A copolymer or copolymer mixture according to claim 1 wherein there is 1% to 10% by weight of (b) present.

13. A copolymer or copolymer mixture according to claim 1 wherein there is 0.1% to 1.0% of (d) present.

14. A process for foaming a copolymer or copolymer mixture of claim 1 comprising heating said copolymer or copolymer mixture for 5 to 60 minutes at 250° to 350° C. in the absence of oxygen.

15. A process for the preparation of a copolymer of claim 1 comprising saponifying a copolymer having
   (a) 40% to 98% by weight ethylene;
   (b) 1.5% to 50% by weight vinyl ester;
   (c) 0.5% to 10% by weight of an acrylic acid ester with an alcoholic solution of an alkali metal hydroxide.

16. A process for preparing a copolymer according to claim 4 which comprises:
   (A) forming a terpolymer of ethylene, vinyl acetate and an acrylic acid ester of a secondary or tertiary alcohol so that such polymer comprises 15 to 96.8% by weight ethylene units, 1.2 to 45% by weight vinyl acetate units and 2 to 40% by weight of acrylic acid ester units;
   (B) saponifying the polymer of step A so that it still contains vinyl acetate units, the vinyl acetate units being present in the polymer in an amount of up to 2% by weight; and
   (C) subjecting said saponified copolymer to sufficient heat to effect thermal cleavage of said acrylic acid ester and olefin whereby said saponified copolymer is foamed and cross-linked.

17. A process according to claim 16 wherein:
   (1) the polymer of step A is formed by forming a polymerization reaction mixture comprising 40 to 98% by weight of ethylene, 1.5 to 50% by weight of a vinyl ester and 0.5 to 10% by weight of an acrylic acid ester of a secondary or tertiary alcohol and said polymerization reaction mixture is subjected to a pressure of 400 to 4,000 bars at a temperature of 110° to 350° C. for sufficient time to form a polymer comprising 15 to 96.8% by weight ethylene, 1.2 to 48% by weight of vinyl acetate units and 2 to 40% by weight of acrylic acid ester units;
   (2) the polymer obtained from step 1 is saponified by contacting the same with an alcoholic solution of an alkali metal hydroxide, the alcohol being a $C_1$ to $C_4$ alcohol and the alkali metal hydroxide being present in an amount of 1 to 10 weight percent at a temperature of 60° to 120° C. for 120 to 180 minutes; and
   (3) the product obtained from step 2 is heated for 5 to 60 minutes at a temperature of 250° to 350° C. sufficient to effect thermal cleavage of the acrylic acid ester and formation of a cross-linked foamed copolymer.

18. A foamable copolymer or copolymer mixture comprising 35 to 98% by weight of ethylene units, 1 to 30% by weight of vinyl alcohol units, 1 to 30% by weight of acrylic acid ester units of secondary or tertiary alcohols and up to 5% by weight of acetate units.

19. A process for forming a copolymer of claim 1 wherein (a) is 40% to 98% ethylene and (d) is 0% to 2% vinyl acetate comprising heating said copolymer for 5 to 60 minutes at 250° to 350° C. in the absence of oxygen.

20. A foamable copolymer according to claim 18 wherein the acrylic acid ester units are units of a tertiary alcohol having 4 to 8 carbon atoms.

21. A process for foaming a copolymer according to claim 18 which comprises heating said copolymer for 5 to 60 minutes at 250° to 350° C. in the absence of oxygen.

22. A process for preparing a copolymer according to claim 18 which comprises saponifying a copolymer having 40 to 98 weight percent units of ethylene, 1.5 to 50 weight percent units of a vinyl ester and 0.5 to 10 weight percent units of an acrylic acid ester with an alcoholic solution of an alkali metal hydroxide.

23. A foamed cross-linked copolymer of a saponified copolymer of ethylene, vinyl alcohol and an acrylic acid ester of a secondary or tertiary alcohol which saponified copolymer contains vinyl acetate in an amount of up to 2% by weight based upon the combined amount of the weight of the units of ethylene, vinyl alcohol and acrylic acid ester, said saponified copolymer comprising 40 to 90% by weight ethylene units, 1 to 30% by weight vinyl alcohol units and 1 to 30% by weight acrylic acid ester units.

24. A foamed cross-linked copolymer according to claim 23 wherein said acrylic acid ester units are ester units of a tertiary alcohol having 4 to 8 carbon atoms.

25. A foamed cross-linked copolymer according to claim 23 wherein said acrylic acid ester units are acrylic acid ester units of an alcohol selected from the group consisting of secondary butanol, tertiary butanol, secondary pentanol and tertiary pentanol.

* * * * *